(12) United States Patent
Takehara

(10) Patent No.: US 12,498,788 B2
(45) Date of Patent: Dec. 16, 2025

(54) MEMORY CONSOLIDATION CONTROLLER, MEMORY CONSOLIDATION METHOD, AND NON-TRANSITORY STORAGE MEDIUM

(71) Applicant: JVCKENWOOD Corporation, Yokohama (JP)

(72) Inventor: Hideki Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 75 days.

(21) Appl. No.: 18/393,811

(22) Filed: Dec. 22, 2023

(65) Prior Publication Data

US 2024/0118748 A1    Apr. 11, 2024

Related U.S. Application Data

(63) Continuation of application No. PCT/JP2022/025025, filed on Jun. 23, 2022.

(30) Foreign Application Priority Data

Jun. 25, 2021   (JP) .................................. 2021-105833
Jun. 25, 2021   (JP) .................................. 2021-106126

(51) Int. Cl.
  *G06F 3/01*   (2006.01)
(52) U.S. Cl.
  CPC .................... *G06F 3/015* (2013.01)
(58) Field of Classification Search
  None
  See application file for complete search history.

(56) References Cited

U.S. PATENT DOCUMENTS

| | | | |
|---|---|---|---|
| 2017/0368348 A1 | 12/2017 | Le Van Quyen et al. | |
| 2018/0068581 A1 | 3/2018 | Skorheim et al. | |
| 2018/0092600 A1* | 4/2018 | Simons | A61N 1/36031 |
| 2019/0216353 A1 | 7/2019 | Garcia Molina et al. | |

FOREIGN PATENT DOCUMENTS

| | | |
|---|---|---|
| CN | 111443799 | 7/2020 |
| JP | 2018-505712 | 3/2018 |
| JP | 2021-503339 | 2/2021 |

OTHER PUBLICATIONS

International Search Report and Written Opinion for International Application No. PCT/JP2022/025025 mailed on Sep. 6, 2022, 10 pages.

* cited by examiner

*Primary Examiner* — Thomas S Mccormack
(74) *Attorney, Agent, or Firm* — Amin, Turocy & Watson, LLP

(57) ABSTRACT

A memory consolidation controller includes: an acquisition unit configured to acquire brain activity information indicating a state of brain activity of a subject; a determination unit configured to determine a sleep level indicating a depth of sleep of the subject and determine an activity state in a predetermined region of the subject's brain based on the acquired brain activity information; and a reproduction control unit configured to cause a reproduction device to reproduce a content that stimulates an auditory sense of the subject based on a determination result of the determination unit.

10 Claims, 14 Drawing Sheets

FIG.3

| SLEEP LEVEL | DEPTH OF SLEEP |
|---|---|
| LEVEL 0 | WAKEFULNESS |
| LEVEL 1 | REM SLEEP |
| LEVEL 2 | STAGE 1 OF NON-REM SLEEP |
| LEVEL 3 | STAGE 2 OF NON-REM SLEEP |
| LEVEL 4 | STAGE 3 OF NON-REM SLEEP |
| LEVEL 5 | STAGE 4 OF NON-REM SLEEP |

FIG.10

| SLEEP LEVEL | DEPTH OF SLEEP |
|---|---|
| LEVEL 0 | WAKEFULNESS |
| LEVEL 1 | REM SLEEP |
| LEVEL 2 | STAGE 1 OF NON-REM SLEEP |
| LEVEL 3 | STAGE 2 OF NON-REM SLEEP |
| LEVEL 4 | STAGE 3 OF NON-REM SLEEP |
| LEVEL 5 | STAGE 4 OF NON-REM SLEEP |

FIG.11

| SENSE | WORD |
|---|---|
| VISUAL SENSE | GLARING  FLICKERING<br>STRONG SUNLIGHT  AFTERNOON SUNLIGHT<br>HEADLAMPS OF ONCOMING CAR, ETC. |
| TACTILE SENSE | PAINFUL  HOT  ROUGH  SMOOTH  SOFT, ETC. |
| SENSE OF SMELL | SCENT OF ROSES  SENSE OF CHRYSANTHEMUM<br>SMELL OF ROTTEN FISH<br>SMELL OF SOY SAUCE, ETC. |

MEMORY CONSOLIDATION CONTROLLER, MEMORY CONSOLIDATION METHOD, AND NON-TRANSITORY STORAGE MEDIUM

CROSS-REFERENCE TO RELATED APPLICATION

This application is a Continuation of PCT International Application No. PCT/JP2022/025025 filed on Jun. 23, 2022 which claims the benefit of priority from Japanese Patent Applications No. 2021-105833 and No. 2021-106126, both filed on Jun. 25, 2021, the entire contents of all of which are incorporated herein by reference.

BACKGROUND OF THE INVENTION

The present application relates to a memory consolidation controller, a memory consolidation method, and a non-transitory storage medium.

There is known a technology for enhancing a cognitive domain of a subject by supplying sensory stimulation to the subject in a sleep state (see, for example, Japanese Patent Application Laid-open No. No. 2021-503339).

In the technology described in Japanese Patent Application Laid-open No. No. 2021-503339, sensory stimulation is supplied irrespective of a state of brain activity of a subject, thus making it difficult to efficiently consolidate memories in the subject. Therefore, there is a need for a technique that can efficiently consolidate memories in the subject.

A memory consolidation controller, a memory consolidation method, and a non-transitory storage medium are disclosed.

SUMMARY OF THE INVENTION

According to one aspect of the present application, there is provided a memory consolidation controller comprising: an acquisition unit configured to acquire brain activity information indicating a state of brain activity of a subject; a determination unit configured to determine a sleep level indicating a depth of sleep of the subject and determine an activity state in a predetermined region of the subject's brain based on the acquired brain activity information; and a reproduction control unit configured to cause a reproduction device to reproduce a content that stimulates an auditory sense of the subject based on a determination result of the determination unit.

According to one aspect of the present application, there is provided a memory consolidation method comprising: acquiring brain activity information indicating a state of brain activity of a subject; determining a sleep level indicating a depth of sleep of the subject and determining an activity state in a predetermined region of the subject's brain based on the acquired brain activity information; and causing a reproduction device to reproduce content that stimulates an auditory sense of the subject based on a determination result.

According to one aspect of the present application, there is provided a non-transitory storage medium that stores a memory consolidation program for causing a computer to perform processing comprising: acquiring brain activity information indicating a state of brain activity of a subject; determining a sleep level indicating a depth of sleep of the subject and determining an activity state in a predetermined region of the subject's brain based on the acquired brain activity information; and causing a reproduction device to reproduce content that stimulates an auditory sense of the subject based on a determination result.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table illustrating an example of sleep levels;

FIG. 10 is a diagram illustrating another example of the temporal change in sleep level of a subject;

FIG. 11 is a table illustrating an example of a correspondence between kinds of stimulus applied to the subject and words reproduced by the reproduction device;

DETAILED DESCRIPTION OF THE INVENTION

Embodiments of a memory consolidation controller, a memory consolidation method, and a non-transitory storage medium according to the present disclosure will be described based on the drawings. It should be noted that the present invention is not limited by the embodiments. The constituent elements in the following embodiments include those that can be replaced or easily conceived by those skilled in the art and those that are substantially the same.

Figure 1:
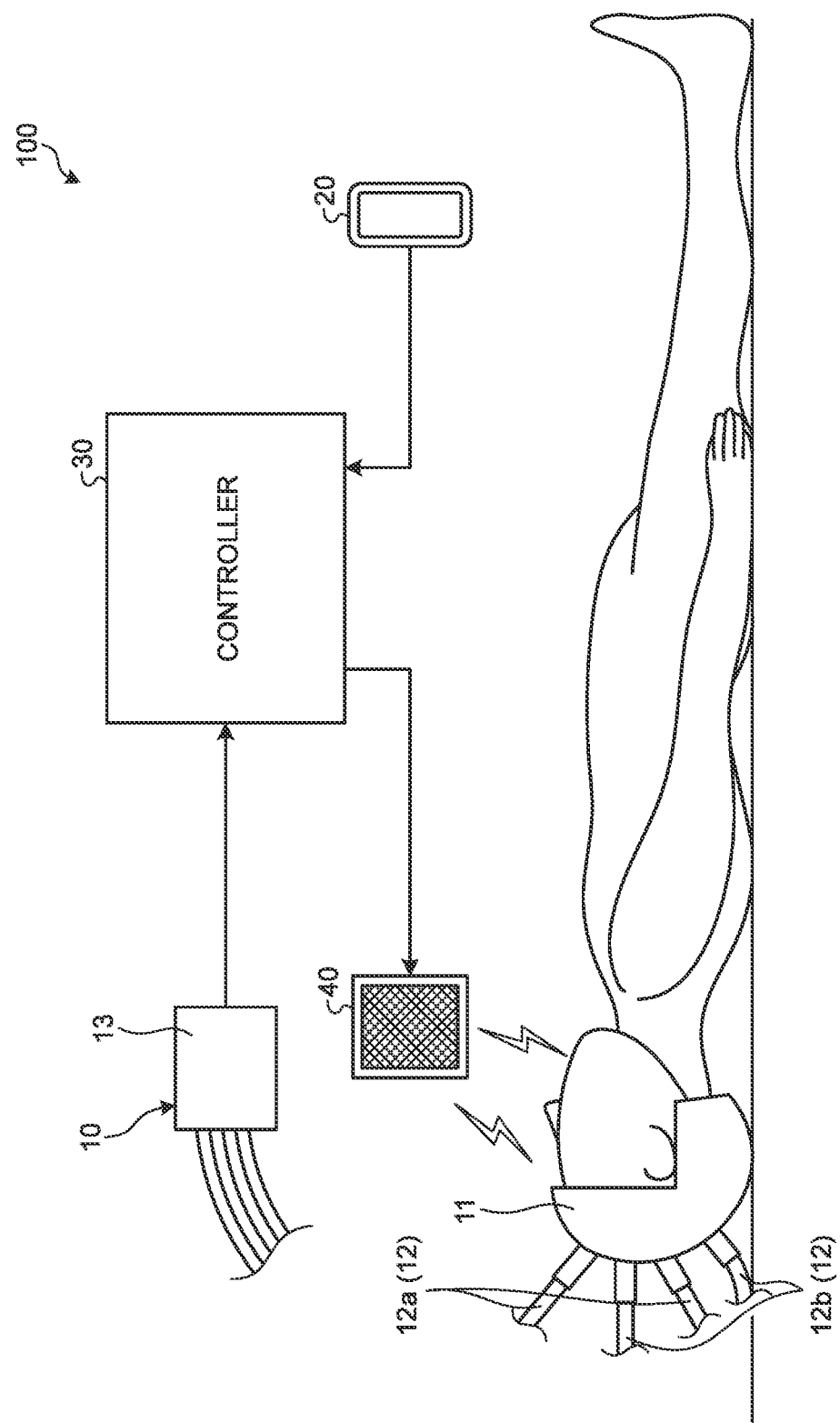
FIG. 1 is a schematic diagram illustrating an example of a memory consolidation system according to the present embodiment.
Figure 2:
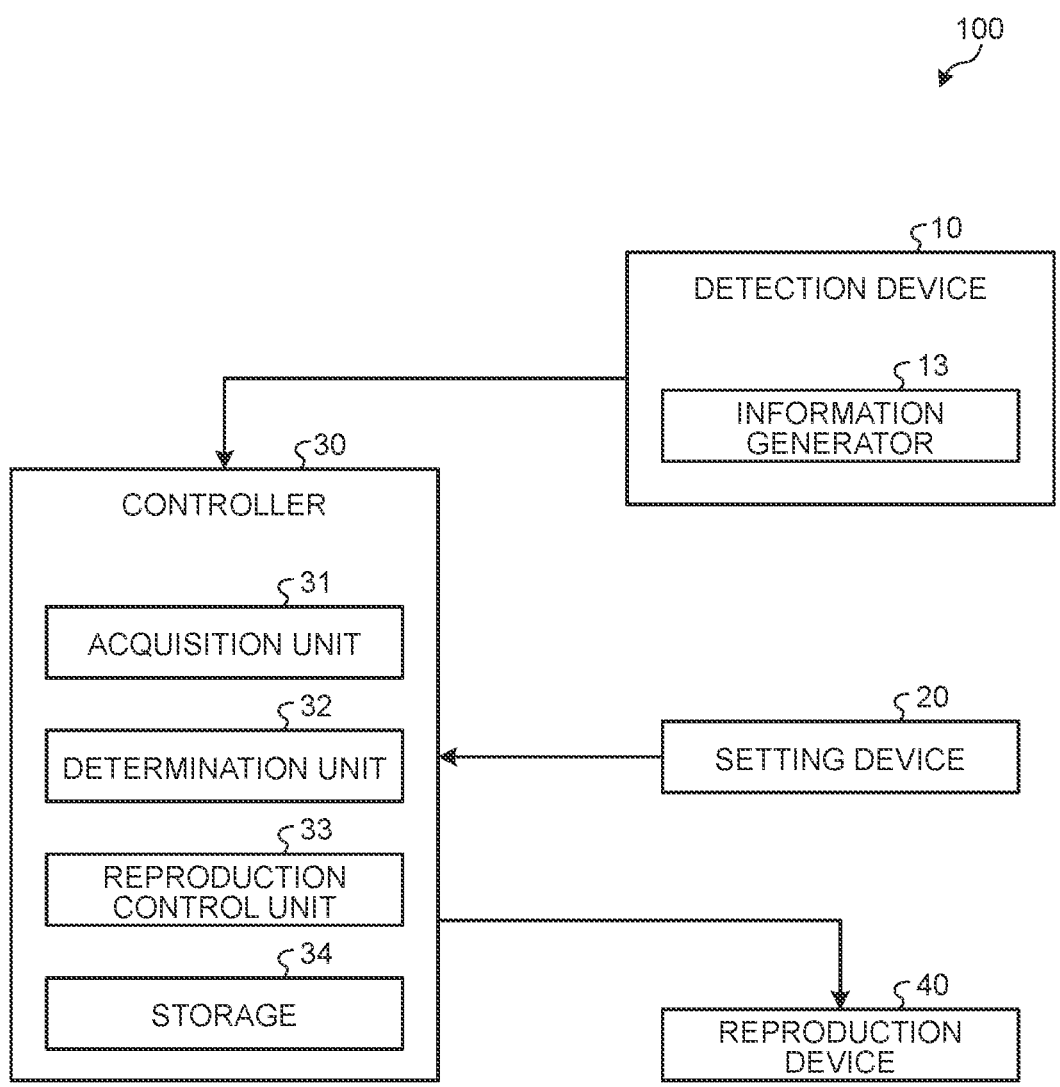
FIG. 2 is a functional block diagram illustrating an example of the memory consolidation system according to the present embodiment.

FIG. 1 is a schematic diagram illustrating an example of a memory consolidation system 100 according to the present embodiment. FIG. 2 is a functional block diagram illustrating an example of the memory consolidation system 100 according to the present embodiment.

As illustrated in FIGS. 1 and 2, the memory consolidation system 100 includes a detection device 10, a setting device 20, a controller (memory consolidation controller) 30, and a reproduction device 40.

The detection device 10 detects brain activity information indicating a state of brain activity of a subject. As the detection device 10, for example, a measurement device that measures cerebral blood flow based on a principle of functional near-infrared spectroscopy (fNIRS) is used. The detection device 10 is not limited to a measurement device based on the principle of fNIRS. For example, a measurement device that performs measurement based on a principle of functional magnetic resonance imaging (fMRI) may be used, which measures brain activity as brain activity information.

The detection device 10 includes, for example, a head-mounted part 11, multiple optical fiber channels 12, and an information generator 13. The head-mounted part 11 is attached to the subject's head. The optical fiber channels 12 include emitting optical fibers 12a for emitting near-infrared light from a not-illustrated light source to the subject's head and receiving optical fibers 12b for receiving near-infrared light reflected or scattered inside the subject's head and sending the received light to the information generator 13. The optical fibers 12a and the optical fibers 12b are disposed at a position to allow measurement on Wernicke's area and Broca's area of the subject's brain.

The information generator 13 calculates oxygenated hemoglobin concentration as brain activity information based on near-infrared light sent from the receiving optical fibers 12b. The information generator 13 may calculate at least one of deoxygenated hemoglobin concentration and total hemoglobin concentration in addition to or instead of oxygenated hemoglobin concentration as brain activity information. In the present embodiment, the brain activity information calculated by the information generator 13 is the activity information on Wernicke's and Broca's areas of the subject's brain. The connection between the optical fibers 12b and the information generator 13 may be wired or wireless. The information generator 13 may be contained in the head-mounted part 11.

The setting device 20 inputs setting information of the memory consolidation system 100. The setting information includes, for example, information on contents to be reproduced by the reproduction device 40. The setting device 20 may be an input device such as a keyboard and a mouse, or a smartphone or a tablet with a touch panel.

The controller 30 centrally controls operation of the memory consolidation system 100. The controller 30 includes a processing unit such as a central processing unit (CPU) and a memory such as a random access memory (RAM) or a read only memory (ROM). The controller 30 includes an acquisition unit 31, a determination unit 32, a reproduction control unit 33, and a storage 34.

The acquisition unit 31 acquires brain activity information generated by the information generator 13 of the detection device 10. The acquisition unit 31 may have the function of the information generator 13 described above. In other words, the acquisition unit 31 may be configured to directly acquire the signal sent from the optical fibers 12b of the detection device 10 and calculate the brain activity information. The acquisition unit 31 acquires the brain activity information every predetermined period of time.

The determination unit 32 determines a sleep level of the subject. The timing at which the determination unit 32 determines the sleep level may be the same timing as or a timing corresponding to a timing at which the acquisition unit 31 acquires the brain activity information, or may be timing different from or not corresponding to a timing at which the acquisition unit 31 acquires the brain activity information.

FIG. 3 is a table illustrating an example of the sleep levels. As illustrated in FIG. 3, in the present embodiment, the sleep levels can be set, for example, in the following six levels: level 0 for wakefulness (not sleep), level 1 for REM sleep, level 2 for a stage 1 of non-REM sleep, level 3 for a stage 2 of non-REM sleep, level 4 for a stage 3 of non-REM sleep, and level 5 for a stage 4 of non-REM sleep. The setting of the sleep levels is not limited to the above. For example, the sleep levels may be set in five or less or seven or more levels. The determination unit 32 may determine the sleep level based on the brain activity information acquired by the acquisition unit 31 or may determine the sleep level based on brain waves or heart rate detected by an electroencephalograph or a heart rate monitor, or human motion and vibration during sleep detected by a three-axis acceleration sensor or the like.

The determination unit 32 determines an activity state in a predetermined region of the subject's brain, based on the brain activity information acquired by the acquisition unit 31. The timing at which the determination unit 32 determines the activity state can be, for example, the same timing as or a timing corresponding to the timing at which the acquisition unit 31 acquires the brain activity information. In the present embodiment, the predetermined region of the brain is, for example, Wernicke's and Broca's areas. The activity state can be set in two levels: an adaptive state (predetermined state) suitable for memory consolidation and a non-adaptive state not suitable for memory consolidation.

Figure 4:
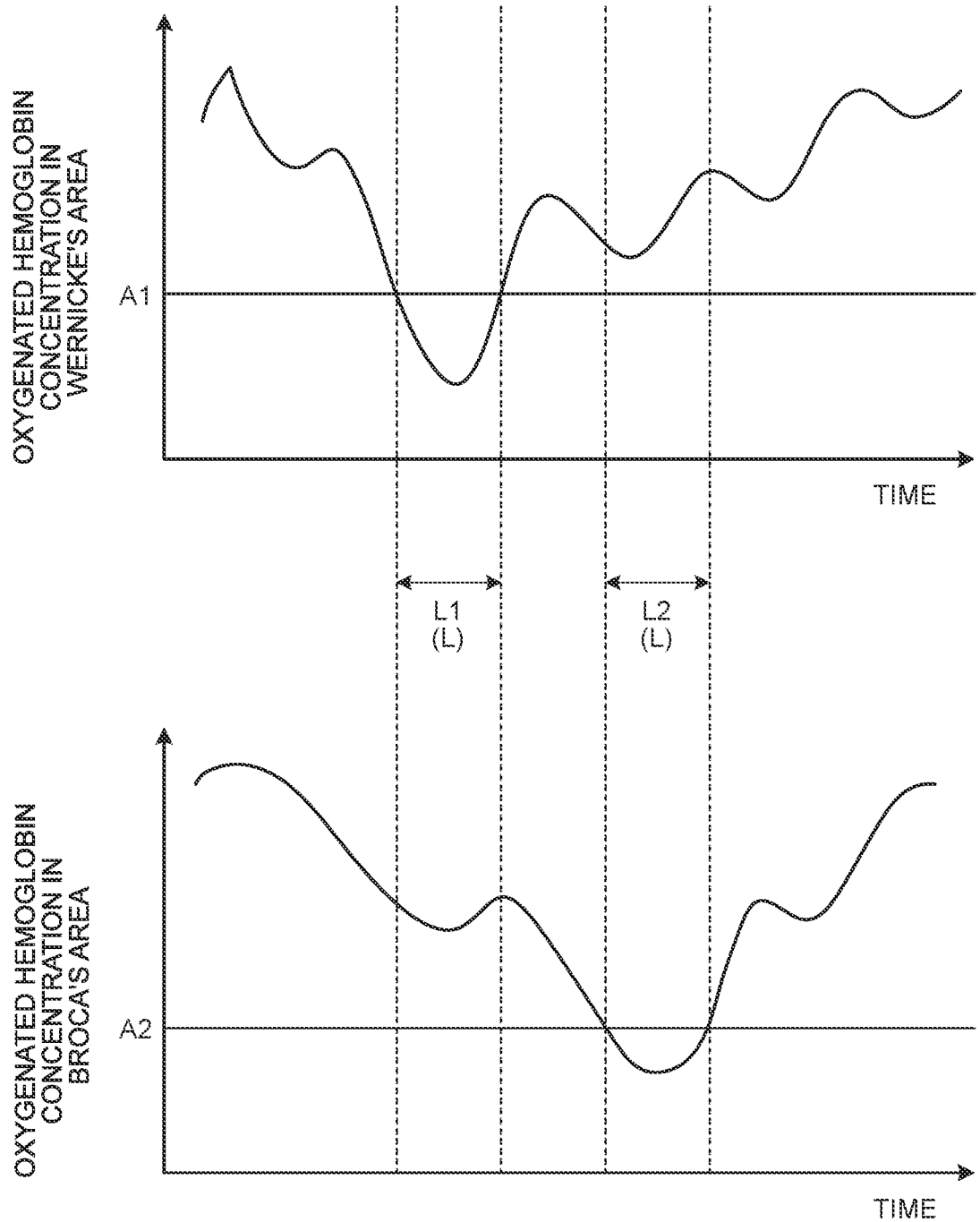
FIG. 4 is a diagram illustrating an example of temporal change in oxygenated hemoglobin concentration in a subject.

FIG. 4 is a diagram illustrating an example of temporal change in oxygenated hemoglobin concentration in a subject. When brain cells are active, oxygen molecules leave oxygenated hemoglobin in the blood (deoxygenation) to form deoxygenated hemoglobin, and the oxygen molecules produced by deoxygenation move to brain cells. In other words, a state with a low oxygenated hemoglobin concentration and a high deoxygenated hemoglobin concentration can be identified as a state in which brain cells are active and deoxygenation is actively taking place. On the other hand, a state with a high oxygenated hemoglobin concentration and a low deoxygenated hemoglobin concentration can be identified as a state in which deoxygenation is not so actively taking place and there is room for brain cell activity.

Thus, as illustrated in FIG. 4, for example, the determination unit 32 can determine that the activity state is an adaptive state if the oxygenated hemoglobin concentration in both of Wernicke's and Broca's areas of the brain is equal to or greater than a predetermined value (threshold values A1 and A2, respectively), and can determine that the activity state is a non-adaptive state if the oxygenated hemoglobin concentration in at least one of Wernicke's and Broca's areas of the brain is less than threshold values A1 and A2, respectively (periods L1 and L2).

The reproduction control unit 33 causes the reproduction device 40 to reproduce a content that stimulates the subject's auditory sense based on the determination result of the determination unit 32. In the present embodiment, the content is, for example, sound set by the subject with the setting device 20 and includes a first content containing a content to be memorized by the subject and a second content different from the first content. Examples of the second content include music related to the content of the first content, music that calms the subject, and sound of advertisements that appeals content of products or services to the subject.

The reproduction control unit 33 causes the reproduction device 40 to reproduce the first content as the content when the determination unit 32 determines that the sleep level is the first level and the activity state is the adaptive state. In the present embodiment, the first level can be, for example, level 1 in which the subject is in REM sleep. In period L (see FIG. 4) with the non-adaptive state, the reproduction control unit 33 performs control such that the first content is not reproduced even if the subject's sleep level is the first level. This control avoids overloading the brain cells more than necessary and allows memory consolidation to take place efficiently in a state in which there is room for brain cell activity.

The reproduction control unit 33 causes the reproduction device 40 to reproduce the second content as the content when the determination unit 32 determines that the sleep level is the second level different from the first level. The second level can be a deeper sleep level than the first level. In the present embodiment, the second level can be, for example, the level corresponding to the stage 1 or the stage 2 of non-REM sleep of the subject, that is, level 2 or level 3. The reproduction control unit 33 may not cause reproduction of the second content. When the reproduction control unit 33 causes the reproduction device 40 to reproduce, for example, the sound of advertisements as the second content, reproduction can be started, for example, after a predetermined time has elapsed since the subject's sleep level is determined to be the second level, so as not to disturb memory consolidation of the content of the first content.

After causing the reproduction device 40 to reproduce the first content, the reproduction control unit 33 stops the first content if the determination unit 32 makes at least one of the following determinations: the determination that the sleep level is a level different from the first level; and the determination that the state of brain activity of the subject is not the adaptive state. After causing the reproduction device 40 to reproduce the second content, the reproduction control unit 33 stops the second content if the determination unit 32 determines that the sleep level is a level different from the second level.

The storage 34 stores various types of information. The storage 34 includes a storage such as a hard disk drive or a solid state drive. An external storage medium such as a removable disk may be used as the storage 34. The storage 34 stores computer programs, data and the like for executing various processing in the acquisition unit 31, the determination unit 32, and the reproduction control unit 33 in the controller 30. The storage 34 also stores the first and the second contents. The storage 34 also stores the settings set with the setting device 20.

The storage 34 stores a computer program for causing a computer to execute processing including: acquiring the brain activity information indicating the state of brain activity of the subject; determining the sleep level indicating the depth of sleep of the subject; determining the activity state in a predetermined region of the subject's brain based on the acquired brain activity information; and causing the reproduction device 40 to reproduce the content that stimulates the auditory sense of the subject based on the determination result.

The reproduction device 40 reproduces the first and the second contents based on control of the reproduction control unit 33. The reproduction device 40 has, for example, a speaker to output sound. For example, the speaker may be installed in headphones that can be mounted on the subject's head.

Figure 5:
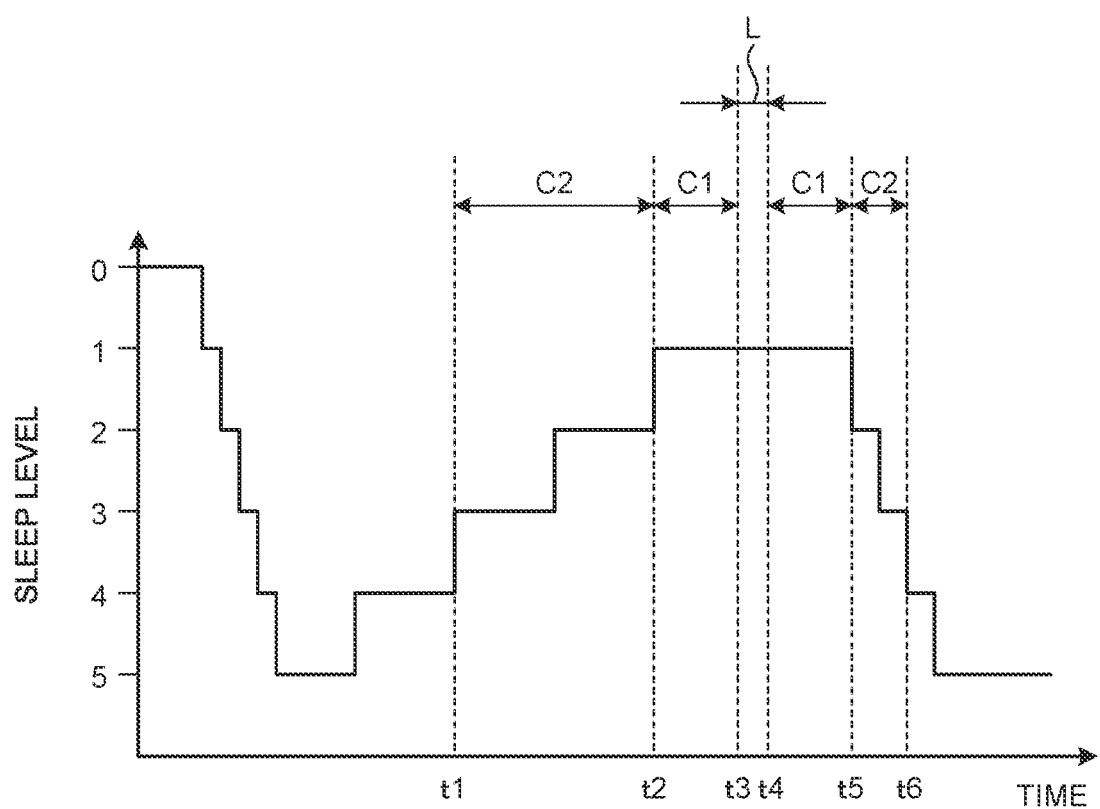
FIG. 5 is a diagram illustrating an example of temporal change in sleep level of a subject.

A memory consolidation method using the memory consolidation system 100 configured as described above will now be described. The subject wears the head-mounted part 11 of the detection device 10 on the head and adjusts its position such that the optical fiber channels 12 correspond to Wernicke's and Broca's areas of the brain. The subject sleeps in this state. FIG. 5 is a diagram illustrating an example of temporal change in sleep level of a subject. In the example illustrated in FIG. 5, the sleep level of the subject gradually changes from level 0 that is wakefulness to a deep sleep state (e.g., level 5) and then repeats up and down over time.

The detection device 10 irradiates the subject's head with near-infrared light from the optical fiber 12a and sends near-infrared light received by the optical fiber 12b to the information generator 13. The information generator 13 calculates the oxygenated hemoglobin concentration in Wernicke's and Broca's areas of the subject's brain as brain activity information based on the near-infrared light sent from the optical fiber 12b.

In the controller 30, the acquisition unit 31 acquires the brain activity information generated by the information generator 13. The determination unit 32 determines the sleep level of the subject and determines the activity state in a predetermined region of the subject's brain based on the brain activity information acquired by the acquisition unit 31.

In the example illustrated in FIG. 5, at time t1, the sleep level of the subject is determined to be level 3 by the determination unit 32. In this case, the reproduction control unit 33 causes the reproduction device 40 to reproduce the second content C2 as the content. The auditory sense of the subject in the level 3 sleep state is stimulated by the second content reproduced by the reproduction device 40. For example, when the auditory sense is stimulated by music related to the content of the first content, memories can be consolidated even in the level 3 or level 4 sleep state. When the auditory sense is stimulated by music that calms the subject, the subject is put in a calm state and thereby relieved from accumulated fatigue. When the auditory sense is stimulated by the sound of advertisements, the content of a product or service can be effectively appealed to the subject in the level 3 or level 4 sleep state. After time t1, the determination result of the subject's sleep level keeps level 3 for a certain period of time and then changes to level 2. During this period, the reproduction control unit 33 continues reproduction of the second content C2.

At time t2, the determination result of the subject's sleep level by the determination unit 32 changes to level 1. In this case, the reproduction control unit 33 checks whether the determination result of the activity state of the subject by the determination unit 32 is the adaptive state. When the activity state of the subject is identified as the adaptive state, the reproduction control unit 33 stops reproduction of the second content C2 and causes the reproduction device 40 to reproduce the first content C1. The auditory sense of the subject in REM sleep (level 1 sleep state) is stimulated by the first content C1 reproduced from the reproduction device 40. This stimulation causes the content included in the first content C1 to be consolidated as memories in the brain.

In period L from time t3 to time t4, the determination result of the activity state of the subject by the determination unit 32 is the non-adaptive state. In this case, the reproduction control unit 33 stops reproduction of the first content C1. At time t4, the determination result of the activity state of the subject is the adaptive state again. In this case, the reproduction control unit 33 resumes reproduction of the first content C1.

After reproduction of the first content C1 is resumed, at time t5, the determination result of the subject's sleep level changes to level 2. In this case, the reproduction control unit 33 stops reproduction of the first content C1 and starts reproduction of the second content C2. After time t5, the determination result of the subject's sleep level keeps level 2 for a certain period of time and then changes to level 3. During this period, the reproduction control unit 33 continues reproduction of the second content C2. At time t6, the determination result of the subject's sleep level changes to level 4. In this case, the reproduction control unit 33 stops reproduction of the second content C2.

In this way, the reproduction control unit 33 causes the reproduction device 40 to reproduce the first and second contents based on the determination result of the subject's sleep level and the determination result of the activity state of the subject, thereby providing auditory stimulation to the subject with the content corresponding to not only the subject's sleep level but also the activity state in a predetermined region of the brain.

Figure 6:
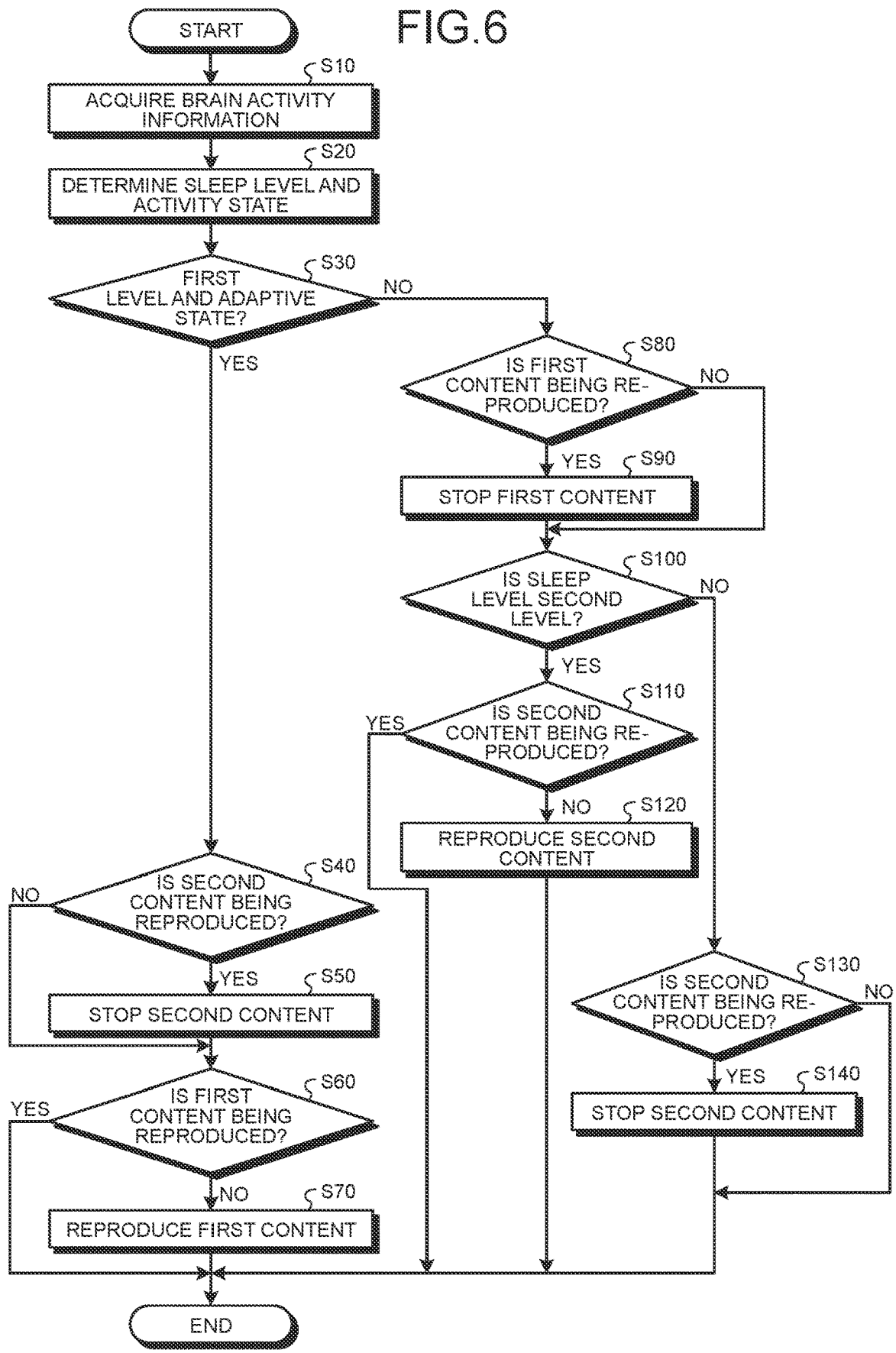
FIG. 6 is a flowchart illustrating an example of operation of a controller.

FIG. 6 is a flowchart illustrating an example of operation of the controller 30. As illustrated in FIG. 6, the acquisition unit 31 acquires the brain activity information generated by the information generator 13 (step S10). The determination unit 32 determines the sleep level of the subject and determines the activity state in a predetermined region of the subject's brain based on the brain activity information acquired by the acquisition unit 31 (step S20).

If the determination unit 32 determines that the sleep level is the first level and the activity state is the adaptive state (Yes at step S30), the reproduction control unit 33 determines whether the second content is being reproduced (step S40). If it is determined that the second content is being reproduced (Yes at step S40), the reproduction control unit 33 stops reproduction of the second content (step S50). If it is determined that the second content is not being reproduced (No at step S40) or if reproduction of the second content is stopped, the reproduction control unit 33 determines whether the first content is being reproduced (step S60). If it is determined that the first content is not being reproduced (No at step S60), the reproduction control unit 33 causes the reproduction device 40 to reproduce the first content (step S70). If it is determined that the first content is being reproduced (Yes at step S60), the reproduction control unit 33 skips step S70 and terminates the process.

If it is determined that the sleep level is not the first level or the activity state is not the adaptive state at step S30 (No at step S30), the reproduction control unit 33 determines whether the first content is being reproduced (step S80). If it is determined that the first content is being reproduced (Yes at step S80), the reproduction control unit 33 stops reproduction of the first content (step S90).

If it is determined that the first content is not being reproduced (No at step S80) or if reproduction of the first content is stopped, the reproduction control unit 33 determines whether the determination result of the sleep level is the second level. If it is determined that the determination result of the sleep level is the second level (Yes at step S100), the reproduction control unit 33 determines whether the second content is being reproduced (step S110). If it is determined that the second content is not being reproduced (No at step S110), the reproduction control unit 33 causes the reproduction device 40 to reproduce the second content (step S120). If it is determined that the second content is being reproduced (Yes at step S110), the reproduction control unit 33 skips step S120 and terminates the process.

On the other hand, if it is determined that the determination result of the sleep level is not the second level (No at step S100), the reproduction control unit 33 determines whether the second content is being reproduced (step S130). If it is determined that the second content is being reproduced (Yes at step S130), the reproduction control unit 33 stops reproduction of the second content (step S140). If it is determined that the second content is not being reproduced (No at step S130), the reproduction control unit 33 skips step S140 and terminates the process.

As described above, the controller 30 according to the present embodiment includes the acquisition unit 31 configured to acquire the brain activity information indicating the state of brain activity of the subject, the determination unit 32 configured to determine the sleep level indicating the depth of sleep of the subject and determine the activity state in a predetermined region of the subject's brain based on the acquired brain activity information, and the reproduction control unit 33 configured to cause the reproduction device 40 to reproduce content that stimulates the auditory sense of the subject based on the determination result of the determination unit 32.

A memory consolidation method according to the present embodiment includes: acquiring the brain activity information indicating the state of brain activity of the subject; determining the sleep level indicating the depth of sleep of the subject, and determining the activity state in a predetermined region of the subject's brain based on the acquired brain activity information; and causing the reproduction device 40 to reproduce content that stimulates the auditory sense of the subject based on the determination result.

According to this configuration, the subject's sleep level as well as the activity state in a predetermined region of the subject's brain is determined, and the content is reproduced in accordance with the results of both determinations, so that memories can be efficiently consolidated in accordance with the state of brain activity when the subject is in a sleep state.

In the controller 30 according to the present embodiment, the reproduction control unit 33 causes reproduction of the first content containing a content to be memorized by the subject as the content when the determination unit 32 determines that the sleep level is the first level and the activity state is a predetermined state. This configuration enables reproduction of the first content containing content to be memorized by the subject at the appropriate timing.

In the controller 30 according to the present embodiment, the first level is REM sleep, and the predetermined state is a state in which the oxygenated hemoglobin concentration in Wernicke's and Broca's areas of the brain is equal to or greater than a predetermined value. This configuration enables efficient memory consolidation in accordance with an activity state in a language center of the subject when the subject is in REM sleep.

In the controller 30 according to the present embodiment, the reproduction control unit 33 causes reproduction of the second content different from the first content as the content when the determination unit 32 determines that the sleep level is the second level different from the first level. This configuration can provide auditory stimulation to the subject with various contents in accordance with the subject's sleep state.

In the controller 30 according to the present embodiment, the second level is at least one of the stage 1 and the stage 2 of non-REM sleep. This configuration can provide auditory stimulation to the subject when the subject is in a relatively shallow state of non-REM sleep.

The technical scope of the present disclosure is not limited to the above embodiment, and changes can be made as appropriate without departing from the gist of the present disclosure. For example, in the above embodiment, level 1 (in a state of REM sleep) is used as the first level of the sleep levels as an example. However, the first level is not limited to this. In addition to or instead of level 1, for example, the first level may be a level corresponding to the stage 1 or the stage 2 of non-REM sleep of the subject, that is, level 2 or level 3.

First Modification

The threshold value of oxygenated hemoglobin concentration may be changed according to the sleep level when the determination unit 32 determines the activity state in a predetermined region of the subject's brain. For example, when the sleep level corresponding to the first level is high (low wakefulness), the threshold value of oxygenated hemoglobin concentration can be increased, and when the sleep level corresponding to the first level is low (high wakefulness), the threshold value of oxygenated hemoglobin concentration can be decreased. In this way, auditory stimulation can be provided to the subject more easily when the level of wakefulness is high, whereas auditory stimulation can be provided to the subject more carefully when the level of wakefulness is low, and thus an impact on the subject's health can be reduced.

Second Modification

The determination unit 32 can determine the adaptive state and the non-adaptive state based on whether the oxygenated hemoglobin concentration in both of Wernicke's and Broca's areas of the brain is equal to or greater than, or less than a predetermined value. However, instead of the oxygenated hemoglobin concentration in Wernicke's and Broca's areas of the brain, a difference between oxygenated hemoglobin concentration and deoxygenated hemoglobin concentration in Wernicke's and Broca's areas of the brain may be used. In other words, the determination unit 32 determines that the activity state is the adaptive state if the difference between oxygenated hemoglobin concentration and deoxygenated hemoglobin concentration in both of Wernicke's and Broca's areas of the brain is equal to or greater than a predetermined value (threshold values B1 and B2, respectively), and determines that the activity state is the non-adaptive state if the difference between oxygenated hemoglobin concentration and deoxygenated hemoglobin concentration in at least one of Wernicke's and Broca's areas of the brain is less than the threshold values B1 and B2, respectively. In this way, when both oxygenated hemoglobin and deoxygenated hemoglobin concentrations are high, auditory stimulation is provided to the subject effectively without forcing further supply of oxygenated hemoglobin on the subject by providing auditory stimulation to the subject. As a result, the impact on the subject's health can be reduced. In addition, the difference between oxygenated hemoglobin concentration and deoxygenated hemoglobin concentration can be used as a relative value to allow for individual differences.

Third Modification

The reproduction control unit 33 can cause the reproduction device 40 to reproduce the second content as the content when the determination unit 32 determines that the sleep level is the second level different from the first level and at a time when a predetermined time has elapsed since the start of sleep. In this way, auditory stimulation can be provided to the subject at a time of day close to a wake-up time to increase a possibility of recalling the first content after waking up while reducing the impact on the subject's health. Furthermore, reproducing an advertisement as the second content can give effective promotion to the subject. Instead of the time after a predetermined time has elapsed since the start of sleep, a predetermined time before the wake-up time can be used. In this case, for example, an alarm clock can be linked.

Each of the modifications as described above can be combined with other modifications.

Figure 7:
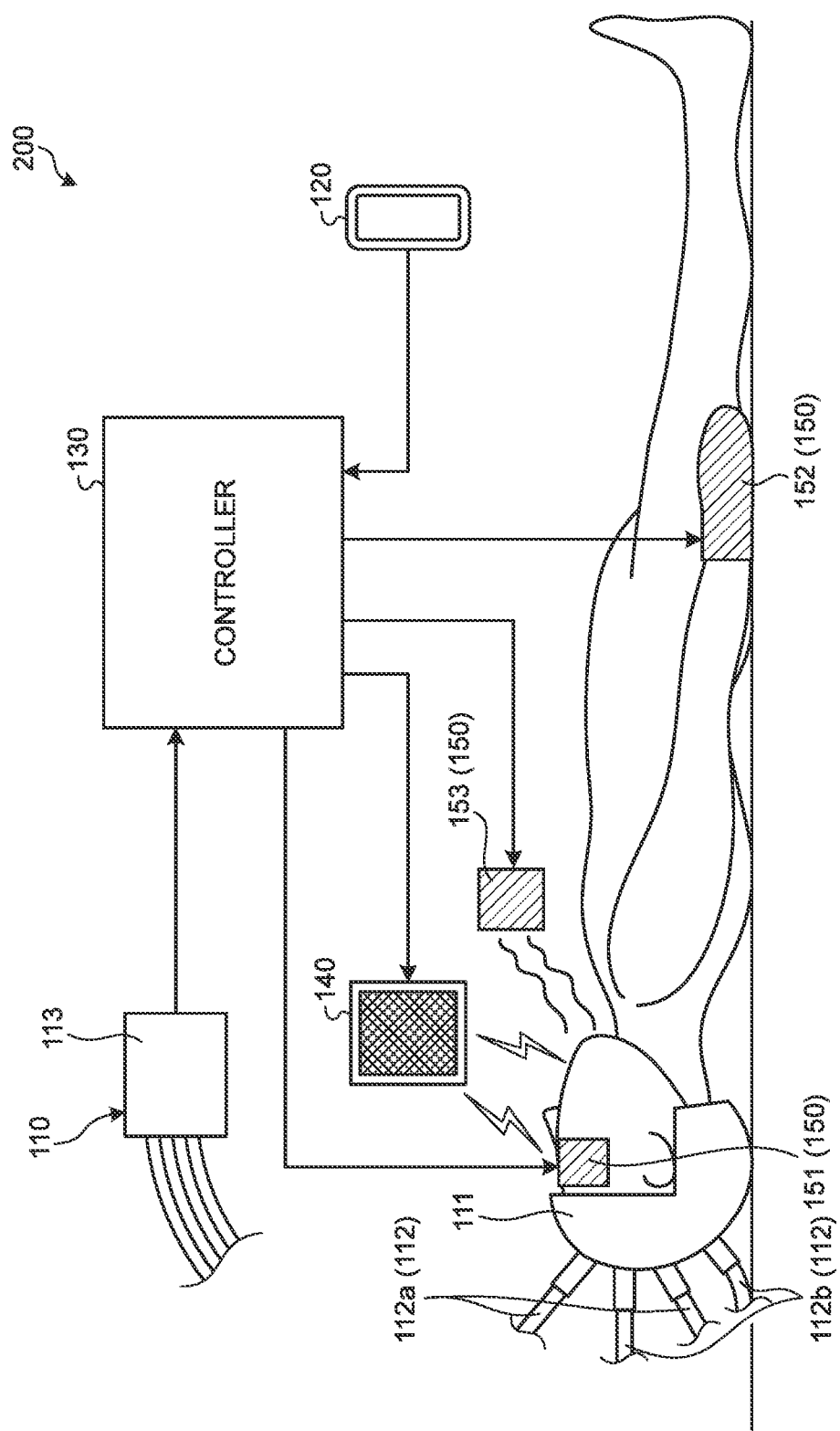
FIG. 7 is a schematic diagram illustrating another example of a memory consolidation system according to the present embodiment.

FIG. 7 is a schematic diagram illustrating another example of a memory consolidation system 200 according to the present embodiment. As illustrated in FIG. 7, the memory consolidation system 200 includes a detection device 110, a setting device 120, a controller (memory consolidation controller) 130, a reproduction device 140, and a stimulus application device 150.

The detection device 110 detects the brain activity information indicating the state of brain activity of the subject. As the detection device 110, for example, a measurement device that measures cerebral blood flow based on the principle of functional near-infrared spectroscopy (fNIRS) is used. The detection device 110 is not limited to a measurement device based on the principle of fNIRS. For example, a measurement device that performs measurement based on the principle of functional magnetic resonance imaging (fMRI) may be used, which measures brain activity as brain activity information.

The detection device 110 includes, for example, a head-mounted part 111, multiple optical fiber channels 112, and an information generator 113. The head-mounted part 111 is attached to the subject's head. The optical fiber channels 112 include emitting optical fibers 112a for emitting near-infrared light from a not-illustrated light source to the subject's head and receiving optical fibers 112b for receiving near-infrared light reflected or scattered inside the subject's head and sending the received light to the information generator 113. The optical fibers 112a and 112b are disposed at a position to allow measurement on Wernicke's area of the subject's brain. The optical fibers 112a and 112b may be disposed at a position to allow measurement on Broca's area, instead of or in addition to Wernicke's area of the subject's brain.

The information generator 113 calculates the oxygenated hemoglobin concentration as the brain activity information based on near-infrared light sent from the receiving optical fibers 112b. The information generator 113 may calculate at least one of deoxygenerated hemoglobin concentration and total hemoglobin concentration in addition to or instead of oxygenated hemoglobin concentration as the brain activity information. In the present embodiment, the brain activity information calculated by the information generator 113 is activity information on Wernicke's area of the subject's brain. The connection between the optical fibers 112b and the information generator 113 may be wired or wireless. The information generator 113 may be contained in the head-mounted part 111.

The setting device 120 inputs setting information of the memory consolidation system 200. The setting information includes, for example, information on contents to be reproduced by the reproduction device 140. The setting device 120 may be an input device such as a keyboard and a mouse, or a smartphone or a tablet with a touch panel.

The controller 130 centrally controls operation of the memory consolidation system 200. The controller 130 has a processing unit such as a central processing unit (CPU) and a memory such as a random access memory (RAM) or a read only memory (ROM).

The reproduction device 140 reproduces third and fourth contents based on control of a reproduction control unit 133. The reproduction device 140 has, for example, a speaker to output sound. For example, the speaker may be installed in headphones that can be mounted on the subject's head.

The stimulus application device 150 is a device that stimulates a sense different from the auditory sense of a subject. The stimulus application device 150 includes, for example, a visual stimulator 151 to stimulate a subject's visual sense, a tactile stimulator 152 to stimulate a subject's tactile sense, and an olfactory stimulator 153 to stimulate a subject's sense of smell. The visual stimulator 151 includes, for example, an eye mask having a light irradiation function. The tactile stimulator 152 includes, for example, a glove-type tactile device. The olfactory stimulator 153 includes, for example, a device capable of injecting fragrance components such as air fresheners. The stimulus application device 150 can provide multimodal stimulation to the subject by applying a stimulus corresponding to words of the content reproduced by the reproduction device 140 as a stimulus to the visual sense, the tactile sense, and the sense of smell.

Figure 8:
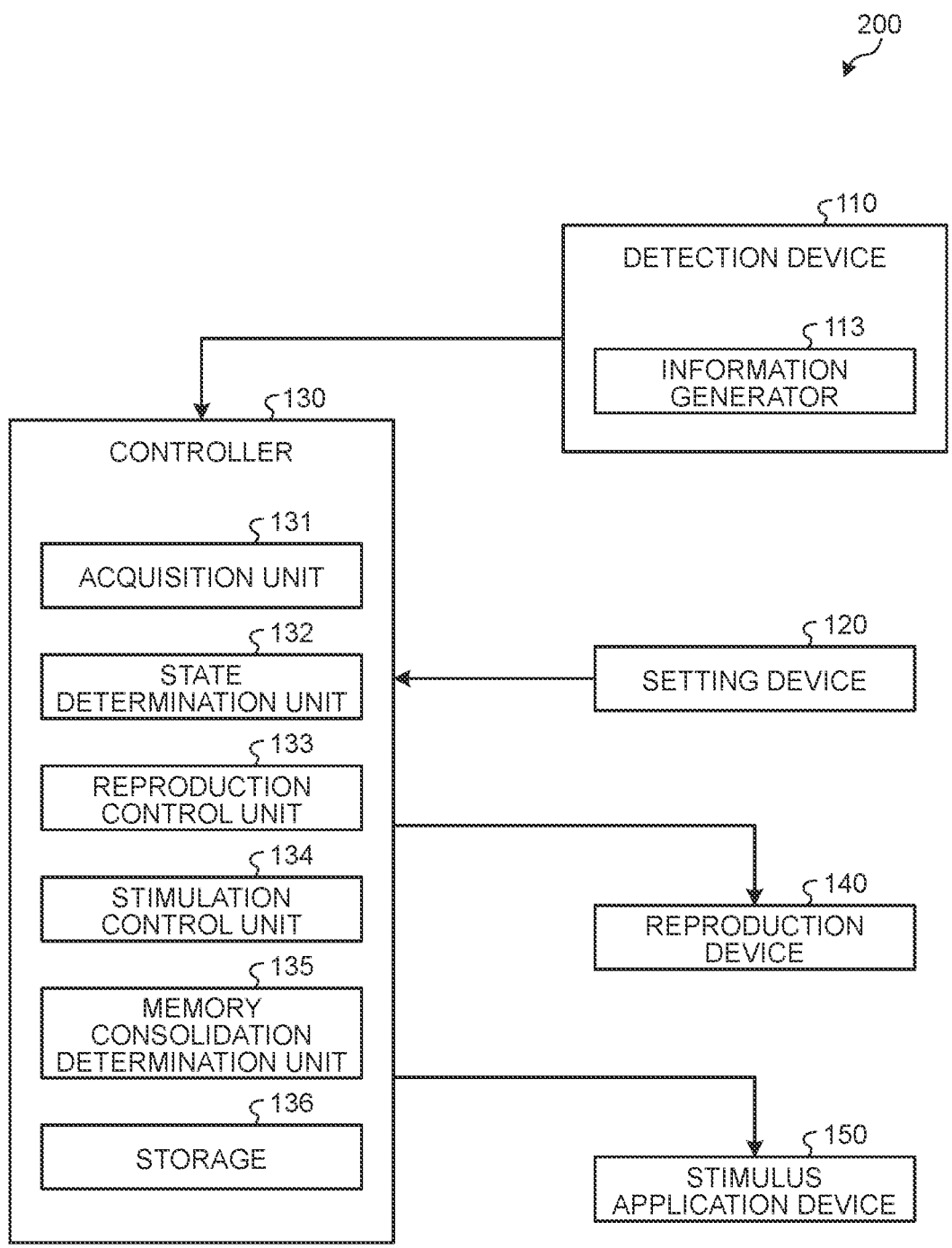
FIG. 8 is a functional block diagram illustrating another example of the memory consolidation system according to the present embodiment.

The configuration of the controller 130 according to the present embodiment will now be described. FIG. 8 is a functional block diagram illustrating another example of the memory consolidation system 200 according to the present embodiment. As illustrated in FIG. 8, the controller 130 includes an acquisition unit 131, a state determination unit (a determination unit) 132, a reproduction control unit 133, a stimulation control unit 134, a memory consolidation determination unit 135, and a storage 136. The controller 130 may additionally include a configuration similar to that of the controller 30 of the memory consolidation system 100 described above, that is, a configuration corresponding to the acquisition unit 31, the determination unit 32, the reproduction control unit 33, and the storage 34.

The acquisition unit 131 acquires the brain activity information generated by the information generator 113 of the detection device 110. The acquisition unit 131 may have the function of the information generator 113 described above. In other words, the acquisition unit 131 may be configured to directly acquire a signal sent from the optical fibers 112b of the detection device 110 and calculate the brain activity information. The acquisition unit 131 acquires the brain activity information every predetermined period of time.

The state determination unit 132 determines the activity state in a predetermined region of the subject's brain based on the brain activity information acquired by the acquisition unit 131. The timing at which the state determination unit 132 determines the activity state can be, for example, the same timing as or timing corresponding to the timing at which the acquisition unit 131 acquires the brain activity information. In the present embodiment, the predetermined region of the brain is, for example, Wernicke's area. The activity state can be set in two levels: an adaptive state (predetermined state) suitable for memory consolidation and a non-adaptive state not suitable for memory consolidation.

Figure 9:
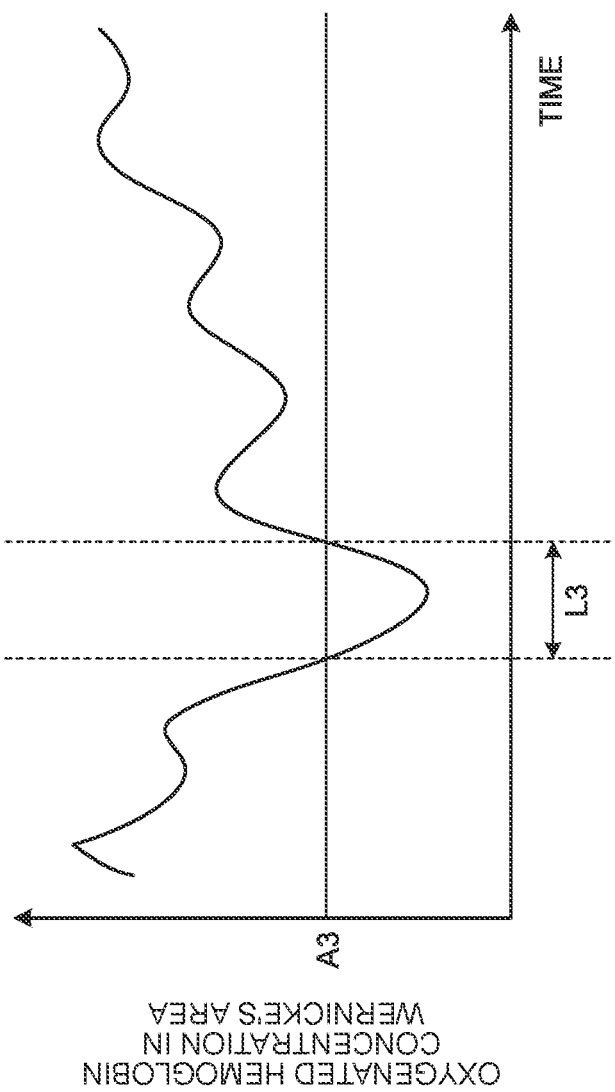
FIG. 9 is a diagram illustrating another example of the temporal change in oxygenated hemoglobin concentration in a subject.

FIG. 9 is a diagram illustrating another example of temporal change in oxygenated hemoglobin concentration in a subject. When brain cells are active, oxygen molecules leave oxygenated hemoglobin in the blood (deoxygenation) to form deoxygenated hemoglobin, and the oxygen molecules produced by deoxygenation move to brain cells. In other words, a state with a low oxygenated hemoglobin concentration and a high deoxygenated hemoglobin concentration can be identified as a state in which brain cells are active and deoxygenation is actively taking place. On the other hand, a state with a high oxygenated hemoglobin concentration and a low deoxygenated hemoglobin concentration can be identified as a state in which deoxygenation is not so actively taking place and there is room for brain cell activity.

Thus, as illustrated in FIG. 9, for example, the state determination unit 132 can determine that the activity state is the adaptive state if the oxygenated hemoglobin concentration in Wernicke's area of the brain is equal to or greater than a predetermined threshold value A3, and can determine that the activity state is the non-adaptive state if the oxygenated hemoglobin concentration in Wernicke's area of the brain is less than the threshold value A3.

The state determination unit 132 may determine the sleep level of the subject. The timing at which the state determination unit 132 determines the sleep level may be the same timing as or a timing corresponding to the timing at which the acquisition unit 131 acquires the brain activity information, or may be a timing different from or not corresponding to the timing at which the acquisition unit 131 acquires the brain activity information.

FIG. 10 is a table illustrating another example of the sleep levels. As illustrated in FIG. 10, in the present embodiment, the sleep levels can be set, for example, in the following six levels: level 0 for wakefulness (not sleep), level 1 for REM sleep, level 2 for a stage 1 of non-REM sleep, level 3 for a stage 2 of non-REM sleep, level 4 for a stage 3 of non-REM sleep, and level 5 for a stage 4 of non-REM sleep. The setting of the sleep levels is not limited to the above. For example, the sleep levels may be set in five or less or seven or more levels. The state determination unit 132 may determine the sleep level based on the brain activity information acquired by the acquisition unit 131 or may determine the sleep level based on brain waves or heart rate detected by an electroencephalograph or a heart rate monitor, or human motion and vibration during sleep detected by a three-axis acceleration sensor or the like.

The reproduction control unit 133 causes the reproduction device 140 to reproduce the content that stimulates the subject's auditory sense based on the determination result of the state determination unit 132. In the present embodiment, the content is, for example, sound set by the subject with the setting device 120, and includes third content containing content to be memorized by the subject and fourth content different from the third content. Examples of the fourth content include music related to the content of the third content, music that calms the subject, and sound of advertisements that appeal content of products or services to the subject.

The reproduction control unit 133 causes the reproduction device 140 to reproduce the third content as the content when the state determination unit 132 determines that the sleep level is the first level and the activity state is the adaptive state. In the present embodiment, the first level can be, for example, level 1 in which the subject is in REM sleep. In a period L3 (see FIG. 9) with the non-adaptive state, the reproduction control unit 133 performs control such that the third content is not reproduced even if the subject's sleep level is the first level. This control avoids overloading the brain cells more than necessary and allows memory consolidation to take place efficiently in a state in which there is room for brain cell activity.

The reproduction control unit 133 causes the reproduction device 140 to reproduce the fourth content as the content when the state determination unit 132 determines that the sleep level is the second level different from the first level. The second level can be a deeper sleep level than the first level. In the present embodiment, the second level can be, for example, the level corresponding to the stage 1 or the stage 2 of non-REM sleep of the subject, that is, level 2 or level 3. The reproduction control unit 133 may not cause reproduction of the fourth content. When the reproduction control unit 133 causes the reproduction device 140 to reproduce, for example, sound of advertisements as the fourth content, reproduction can be started, for example, after a predetermined time has elapsed since the subject's sleep level is determined to be the second level, so as not to disturb memory consolidation of the content of the third content.

After causing the reproduction device 140 to reproduce the third content, the reproduction control unit 133 stops the third content if the state determination unit 132 makes at least one of the following determinations: the determination that the sleep level is a level different from the first level; and the determination that the state of brain activity of the subject is not the adaptive state. After causing the reproduction device 140 to reproduce the fourth content, the reproduction control unit 133 stops the fourth content if the state determination unit 132 determines that the sleep level is a level different from the second level.

The reproduction control unit 133 adjusts a reproduction mode of the content in the reproduction device 140 based on the determination result of the memory consolidation determination unit 135 described later. For example, the reproduction control unit 133 may switch the content to be reproduced by the reproduction device 140 from the content reproduced at present (the third content to be memorized) to another content if the determination result of the memory consolidation determination unit 135 is a consolidated state (the state in which memories are consolidated, which will be described later). In this case, the content to be switched may be any other third content set in advance by the subject or may be the fourth content. When the content to be switched is selected from different kinds of the third content, the reproduction control unit 133 selects the third content based on a setting of a reproduction order if the reproduction order has been set by the setting device 120. The reproduction control unit 133 may calculate a degree of comprehension difficulty based on an amount of language, field, and others included in the third content, and select the third content based on the calculated degree of comprehension difficulty. In this case, the reproduction control unit 133 can select the third content, for example, in ascending or descending order of the degree of comprehension difficulty. The reproduction control unit 133 may cause the reproduction device 140 to repeatedly reproduce the content reproduced at present (the third content to be memorized) if the determination result of the memory consolidation determination unit 135 is a non-consolidated state (the state in which memories are not consolidated, which will be described later).

The stimulation control unit 134 causes the stimulus application device 150 to apply a stimulus to a sense different from the auditory sense of the subject when the content is reproduced by the reproduction device 140. For example, the stimulation control unit 134 can cause the stimulus application device 150 to apply a stimulus corresponding to words reproduced by the reproduction device 140 to the subject when the third content is reproduced by the reproduction device 140.

FIG. 11 is a table illustrating another example of a correspondence between kinds of stimulus applied to the subject and words reproduced by the reproduction device 140. As illustrated in FIG. 11, for example, when words representing a visual state such as glaring, flickering, strong sunlight, afternoon sunlight, and headlamps of an oncoming car are reproduced by the reproduction device 140, the stimulation control unit 134 can apply a stimulus to a subject's visual sense to the subject by the visual stimulator 151. For example, when words representing a tactile state such as painful, hot, rough, smooth, and soft are reproduced by the reproduction device 140, the stimulation control unit 134 can apply a stimulus to a subject's sense of touch to the subject by the tactile stimulator 152. For example, when words representing a olfactory state such as a scent of roses, a scent of chrysanthemum, a smell of rotten fish, and a smell of soy sauce are reproduced by the reproduction device 140, the stimulation control unit 134 can apply a stimulus to a subject's sense of smell to the subject by the olfactory stimulator 153.

The memory consolidation determination unit 135 determines whether the content are consolidated as memories. In the present embodiment, the memory consolidation determination unit 135 determines whether the third content to be memorized set by the setting device 120 are consolidated as memories. The memory consolidation determination unit 135 may determine whether the fourth content are consolidated as memories.

Figure 12:
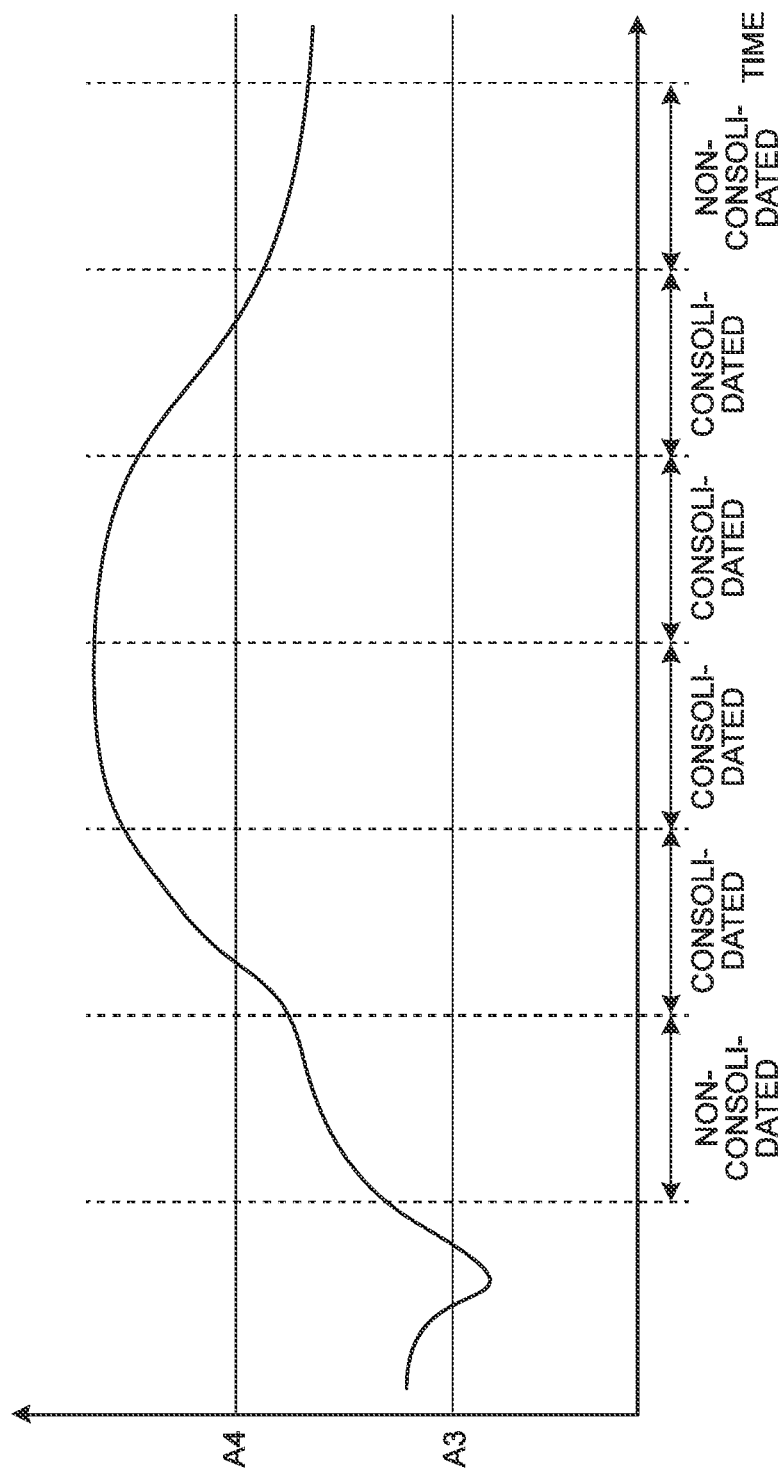
FIG. 12 is a diagram illustrating another example of the temporal change in oxygenated hemoglobin concentration in Wernicke's area of the subject.

FIG. 12 is a diagram illustrating another example of temporal change in oxygenated hemoglobin concentration in Wernicke's area of the subject. It is known that when Wernicke's area understands a meaning of a language, the language can be processed without increasing an activity in Wernicke's area and thus deoxygenation is reduced and the oxygenated hemoglobin concentration is increased. On the other hand, it is known that when Wernicke's area does not understand a meaning of a language, deoxygenation is not reduced and thus the oxygenated hemoglobin concentration is not increased. In other words, when the oxygenated hemoglobin concentration is high, Wernicke's area understands a meaning of a language and memories can be identified as being consolidated. On the other hand, when the oxygenated hemoglobin concentration is low, Wernicke's area does not understand a meaning of a language and memories can be identified as not being consolidated. Thus, the memory consolidation determination unit 135 determines that memories are consolidated if the oxygenated hemoglobin concentration in Wernicke's area of the brain is equal to or greater than a predetermined threshold value A4 (hereinafter referred to as "consolidated state"), and determines that memories are not consolidated if it is less than the threshold value A4 (hereinafter referred to as "non-consolidated state"). The threshold value A4 of the oxygenated hemoglobin concentration in Wernicke's area of the subject's brain can be set such that A3<A4 since it is a prerequisite that the activity state is the adaptive state. In the example illustrated in FIG. 12, the memory consolidation determination unit 135 makes a determination every predetermined unit period and determines that memories are consolidated if the oxygenated hemoglobin concentration is equal to or greater than the threshold value A4 for at least a part of the unit period, but this example should not be construed as limiting. Here, the memory consolidation determination unit 135 may determine that memories are in the consolidated state if the deoxygenated hemoglobin concentration in Wernicke's area of the brain is less than a predetermined threshold value, and may determine that memories are in the non-consolidated state if it is equal to or greater than the predetermined threshold value.

The storage 136 stores various types of information. The storage 136 includes a storage such as a hard disk drive or a solid state drive. An external storage medium such as a removable disk may be used as the storage unit 136. The storage 136 stores computer programs, data and the like for executing various processing in the acquisition unit 131, the state determination unit 132, and the reproduction control unit 133 in the controller 130. The storage 136 also stores the third and the fourth contents. The storage 136 also stores the settings set with the setting device 120.

The storage 136 stores a computer program for causing a computer to execute processing including: acquiring brain activity information indicating a state of brain activity of a subject; determining an activity state in a predetermined region of the subject's brain based on the acquired brain activity information; causing the reproduction device 140 to reproduce content that stimulates an auditory sense of the subject based on the determination result of the activity state; and determining whether the content are consolidated as memories.

Figure 13:
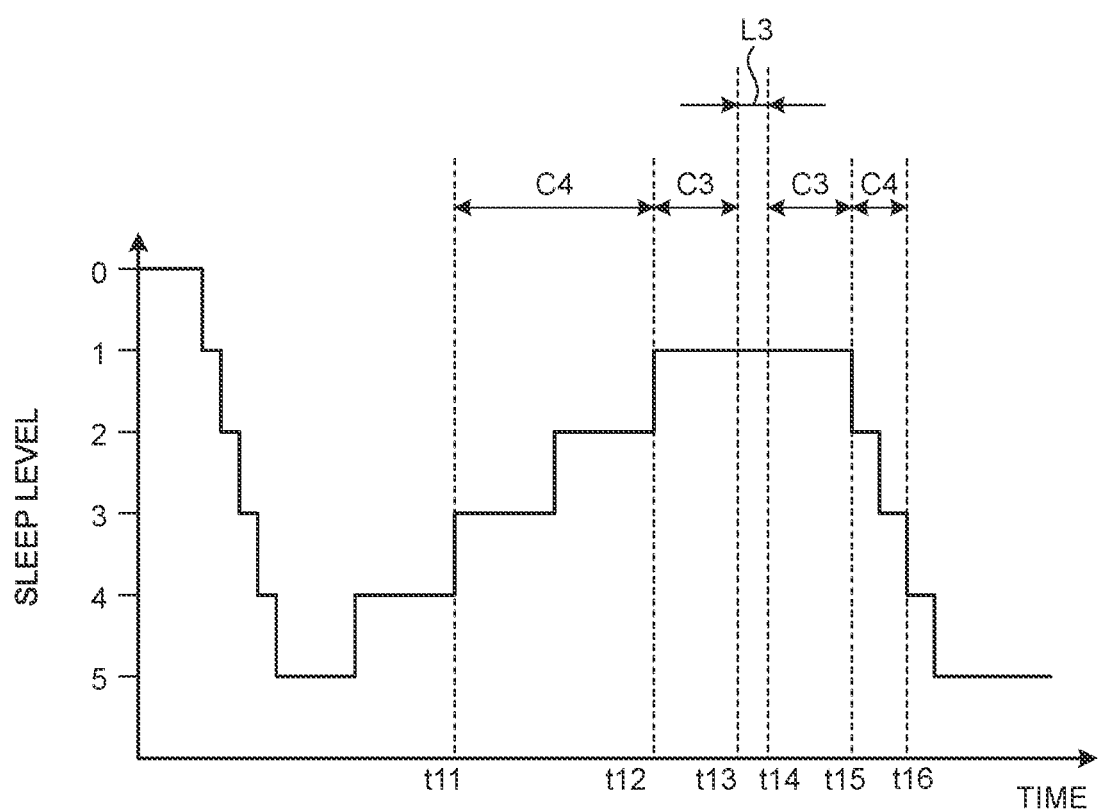
FIG. 13 is a diagram illustrating another example of the temporal change in sleep level of a subject.

A memory consolidation method by the memory consolidation system 200 configured as described above will now be described. The subject wears the head-mounted part 111 of the detection device 110 on the head and adjusts its position such that the optical fiber channels 112 correspond to Wernicke's area of the brain. The subject sleeps in this state. FIG. 13 is a diagram illustrating another example of temporal change in sleep level of a subject. In the example illustrated in FIG. 13, the sleep level of the subject gradually changes from level 0 that is wakefulness to a deep sleep state (e.g., level 5) and then repeats up and down over time.

The detection device 110 irradiates the subject's head with near-infrared light from the optical fibers 112a and sends near-infrared light received by the optical fibers 112b to the information generator 113. The information generator 113 calculates the oxygenated hemoglobin concentration in Wernicke's area of the subject's brain as brain activity information based on near-infrared light sent from the optical fibers 112b.

In the controller 130, the acquisition unit 131 acquires the brain activity information generated by the information generator 113. The state determination unit 132 determines the sleep level of the subject and determines the activity state in a predetermined region of the subject's brain based on the brain activity information acquired by the acquisition unit 131.

In the example illustrated in FIG. 13, at time t11, the sleep level of the subject is determined to be level 3 by the state determination unit 132. In this case, the reproduction control unit 133 causes the reproduction device 140 to reproduce the fourth content C4 as the content. The auditory sense of the subject in the level 3 sleep state is stimulated by the fourth content reproduced by the reproduction device 140. For example, when the auditory sense is stimulated by music related to the content of the third content, memories can be consolidated even in the level 3 or level 4 sleep state. When the auditory sense is stimulated by music that calms the subject, the subject is put in a calm state and thereby relieved from accumulated fatigue. When the auditory sense is stimulated by the sound of advertisements, the content of a product or service can be effectively appealed to the subject in the level 3 or level 4 sleep state. After time t11, the determination result of the subject's sleep level keeps level 3 for a certain period of time and then changes to level 2. During this period, the reproduction control unit 133 continues reproduction of the fourth content C4.

At time t12, the determination result of the subject's sleep level by the state determination unit 132 changes to level 1. In this case, the reproduction control unit 133 checks whether the determination result of the activity state of the subject by the state determination unit 132 is the adaptive state. When the activity state of the subject is identified as the adaptive state, the reproduction control unit 133 stops reproduction of the fourth content C4 and causes the reproduction device 140 to reproduce the third content C3. The auditory sense of the subject in REM sleep (level 1 sleep state) is stimulated by the third content C3 reproduced by the reproduction device 140. This stimulation causes the content contained in the third content C3 to be consolidated in the brain as memories. When the third content C3 is reproduced, the stimulation control unit 134 may cause the stimulus application device 150 to apply a stimulus to a sense different from the auditory sense.

When the third content C3 is reproduced by the reproduction device 140, the memory consolidation determination unit 135 determines whether the content of the third content C3 are consolidated in the subject as memories or not (whether it is in a consolidated state or a non-consolidated state). If the memory consolidation determination unit 135 determines that it is in a consolidated state, the reproduction control unit 133 can stop reproduction of the third content C3 or change the content of the third content C3 and cause the reproduction device 140 to reproduce the changed content. If the memory consolidation determination unit 135 determines that it is in a non-consolidated state, the content of the third content C3 can be repeatedly reproduced by the reproduction device 140.

In period L3 from time t13 to time t14, the determination result of the activity state of the subject by the state determination unit 132 is the non-adaptive state. In this case, the reproduction control unit 133 stops reproduction of the third content C3. At time t14, the determination result of the activity state of the subject is the adaptive state again. In this case, the reproduction control unit 133 resumes reproduction of the third content C3.

After reproduction of the third content C3 is resumed, at time t15, the determination result of the subject's sleep level changes to level 2. In this case, the reproduction control unit 133 stops reproduction of the third content C3 and starts reproduction of the fourth content C4. After time t15, the determination result of the subject's sleep level keeps level 2 for a certain period of time and then changes to level 3. During this period, the reproduction control unit 133 continues reproduction of the fourth content C4. At time t16, the determination result of the subject's sleep level changes to level 4. In this case, the reproduction control unit 133 stops reproduction of the fourth content C4.

In this way, since the memory consolidation determination unit 135 determines whether memories are in the consolidated state or the non-consolidated state, whether the content of the third content C3 is consolidated in the subject as memories can be easily identified. In addition, since the reproduction control unit 133 adjusts the reproduction mode of the content in the reproduction device 140 based on the determination result of the memory consolidation determination unit 135, reproduction of content can be performed in accordance with the memory consolidated state of the subject. In addition, the stimulation control unit 134 causes the stimulus application device 150 to apply a stimulus to a sense different from the auditory sense of the subject when the content is reproduced from the reproduction device 140. This stimulation can promote memory consolidation in the subject.

Figure 14:
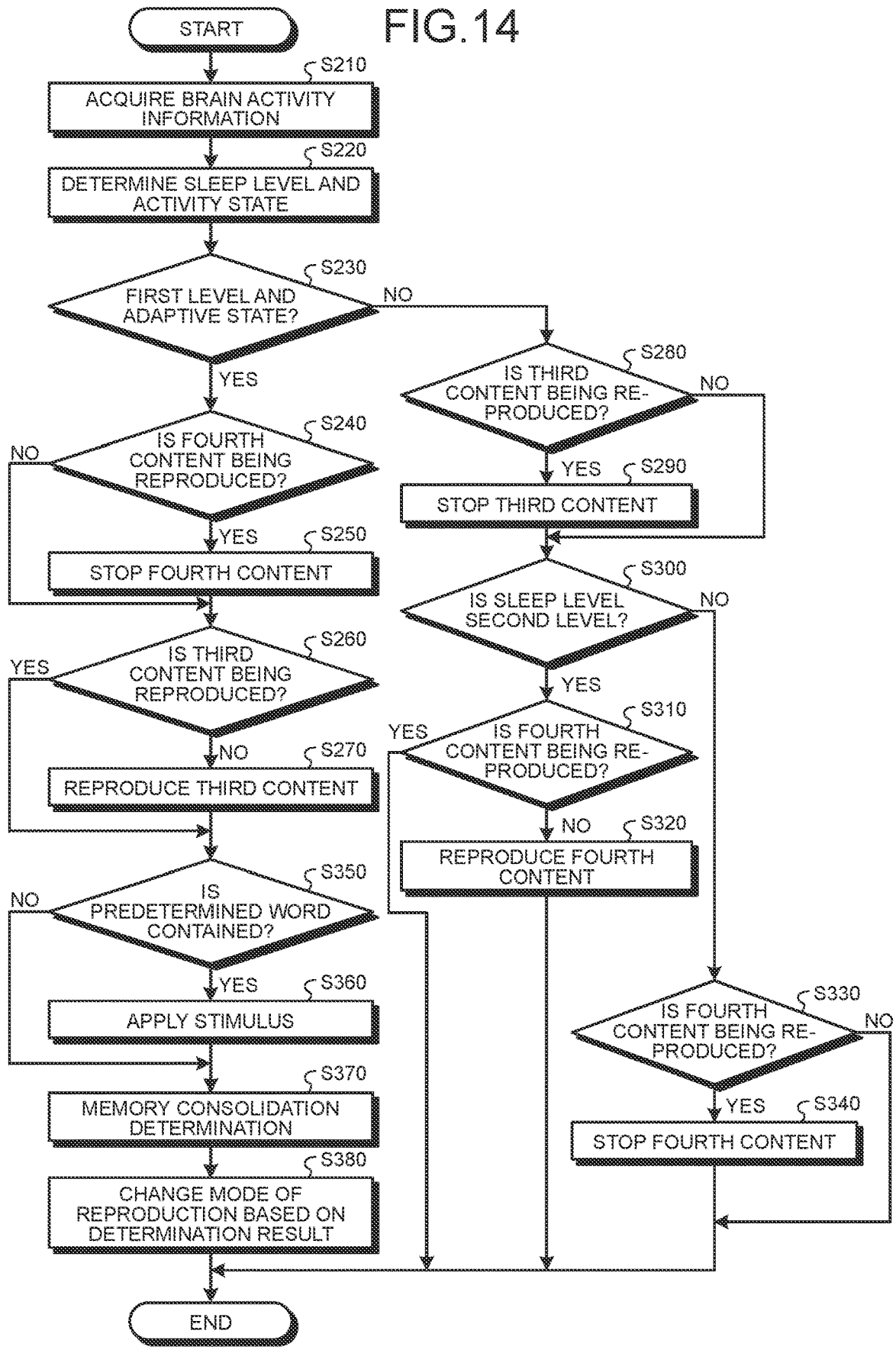
FIG. 14 is a flowchart illustrating another example of the operation of the controller.

FIG. 14 is a flowchart illustrating another example of the operation of the controller 130. As illustrated in FIG. 14, the acquisition unit 131 acquires the brain activity information generated by the information generator 113 (step S210). The state determination unit 132 determines the sleep level of the subject and determines the activity state in a predetermined region of the subject's brain based on the brain activity information acquired by the acquisition unit 131 (step S220).

If the state determination unit 132 determines that the sleep level is the first level and the activity state is the adaptive state (Yes at step S230), the reproduction control unit 133 determines whether the fourth content is being reproduced (step S240). If it is determined that the fourth content is being reproduced (Yes at step S240), the reproduction control unit 133 stops reproduction of the fourth content (step S250). If it is determined that the fourth content is not being reproduced (No at step S240) or if reproduction of the fourth content is stopped, the reproduction control unit 133 determines whether the third content is being reproduced (step S260). If it is determined that the third content is not being reproduced (No at step S260), the reproduction control unit 133 causes the reproduction device 140 to reproduce the third content (step S270). If it is determined that the third content is being reproduced (Yes at step S260), the reproduction control unit 133 skips step S270 and performs the process after step S350 described later.

If it is determined that the sleep level is not the first level or the activity state is not the adaptive state at step S230 (No at step S230), the reproduction control unit 133 determines whether the third content is being reproduced (step S280). If it is determined that the third content is being reproduced (Yes at step S280), the reproduction control unit 133 stops reproduction of the third content (step S290).

If it is determined that the third content is not being reproduced (No at step S280) or if reproduction of the third content is stopped, the reproduction control unit 133 determines whether the determination result of the sleep level is the second level. If it is determined that the determination result of the sleep level is the second level (Yes at step S300), the reproduction control unit 133 determines whether the fourth content is being reproduced (step S310). If it is determined that the fourth content is not being reproduced (No at step S310), the reproduction control unit 133 causes the reproduction device 140 to reproduce the fourth content (step S320). If it is determined that the fourth content is being reproduced (Yes at step S310), the reproduction control unit 133 skips step S320 and terminates the process.

On the other hand, if it is determined that the determination result of the sleep level is not the second level (No at step S300), the reproduction control unit 133 determines whether the fourth content is being reproduced (step S330). If it is determined that the fourth content is being reproduced (Yes at step S330), the reproduction control unit 133 stops reproduction of the fourth content (step S340). If it is determined that the fourth content is not being reproduced (No at step S330), the reproduction control unit 133 skips step S340 and terminates the process.

If step S270 is performed, or if the process of No at step S260 is performed, the stimulation control unit 134 determines whether the third content reproduced by the reproduction device 140 contains a predetermined word (step S350). If it is determined that a predetermined word is contained (Yes at step S350), the stimulation control unit 134 causes the stimulus application device 150 to apply a stimulus to the sense corresponding to the word to the subject (step S360). If it is determined that a predetermined word is not contained (No at step S350), the stimulation control unit 134 skips the process at step S360.

If step S360 is performed, or if the process of No at step S350 is performed, the memory consolidation determination unit 135 determines whether the content of the third content are consolidated in the subject as memories (whether it is in a consolidated state or a non-consolidated state) (step S370). The reproduction control unit 133 causes the reproduction device 100 to perform at least one of: changing content reproduced by the reproduction device 140; and changing the reproduction mode of the content in the reproduction device 140 based on the determination result of the memory consolidation determination unit 135 (step S380).

If the memory consolidation determination unit 135 determines that it is in a consolidated state at step S380, the reproduction control unit 133 can cause processing, such as stopping reproduction of the third content or reproducing the next third content if multiple third contents are set by the setting device 120.

If the memory consolidation determination unit 135 determines that it is in a non-consolidated state at step S380, the reproduction control unit 133 can cause processing, such as causing the reproduction device 140 to repeatedly reproduce the content of the third content or causing the reproduction device 140 to reproduce the fourth content having content that helps in understanding the content of the third content. When the content of the third content is repeatedly reproduced by the reproduction device 140, the reproduction speed may be changed, for example, the reproduction speed is slowed.

As described above, the controller 130 according to the present embodiment includes the acquisition unit 131 configured to acquire the brain activity information indicating the state of the brain activity of the subject, the state determination unit 132 configured to determine the activity state in a predetermined region of the subject's brain based on the acquired brain activity information, the reproduction control unit 133 configured to cause the reproduction device 140 to reproduce content that stimulates the auditory sense of the subject based on the determination result of the state determination unit 132, and the memory consolidation determination unit 135 configured to determine whether the content is consolidated as memories.

A memory consolidation method according to the present embodiment includes: acquiring the brain activity information indicating the state of brain activity of the subject; determining the activity state in a predetermined region of the subject's brain based on the acquired brain activity information; causing the reproduction device 140 to reproduce content that stimulates the auditory sense of the subject based on the determination result of the activity state; and determining whether the content is consolidated as memories.

According to this configuration, since it is determined whether the content reproduced by the reproduction device 140 are consolidated as memories in the subject, whether the content is consolidated as memories in the subject can be easily identified, and memories can be consolidated efficiently in the subject.

In the controller 130 according to the present embodiment, the reproduction control unit 133 causes the reproduction device 100 to perform at least one of: changing content reproduced by the reproduction device 140; and changing the reproduction mode of the content in the reproduction device 140, based on the determination result of the memory consolidation determination unit 135. In this configuration, at least one of the content and the reproduction mode of the content is changed according to the memory consolidation state in the subject. This configuration enables efficient memory consolidation in the subject.

In the controller 130 according to the present embodiment, the predetermined state is a state in which the oxygenated hemoglobin concentration in Wernicke's area of the subject's brain is equal to or greater than the third threshold value A3. This configuration enables efficient memory consolidation in accordance with the activity state in the language center of the subject.

In the controller 130 according to the present embodiment, the memory consolidation determination unit 135 determines that the content is consolidated as memories if the oxygenated hemoglobin concentration in Wernicke's area of the subject's brain is equal to or greater than the third threshold value A3. In this configuration, whether the content is consolidated as memories in the subject can be easily identified in accordance with the activity state in the language center of the subject.

The controller 130 according to the present embodiment further includes the stimulation control unit 134 configured to cause the stimulus application device to apply a stimulus to a sense different from the auditory sense of the subject when the content is reproduced. This configuration can apply multimodal stimulation to a sense different from the auditory sense to the subject and thus enables efficient memory consolidation.

The technical scope of the present invention is not limited to the above embodiments, and changes can be made as appropriate without departing from the gist of the present invention. For example, in the above embodiment, level 1 (in a state of REM sleep) is used as the first level of sleep levels as an example. However, the first level is not limited thereto. In addition to or instead of level 1, for example, the first level may be a level corresponding to the stage 1 or the stage 2 of non-REM sleep of the subject, that is, level 2 or level 3.

Fourth Modification

When the state determination unit 132 determines the activity state in a predetermined region of the subject's brain, the threshold value of the oxygenated hemoglobin concentration may be changed according to the sleep level. For example, when the sleep level corresponding to the first level is high (low wakefulness), the threshold value of oxygenated hemoglobin concentration can be increased, and when the sleep level corresponding to the first level is low (high wakefulness), the threshold value of oxygenated hemoglobin concentration can be decreased. In this way, auditory stimulation can be provided to the subject more easily when the level of wakefulness is high, whereas auditory stimulation can be provided to the subject more carefully when the level of wakefulness is low, and thus the impact on the subject's health can be reduced.

Fifth Modification

The state determination unit 132 determines whether the activity state is the adaptive state or the non-adaptive state based on whether the oxygenated hemoglobin concentration in Wernicke's area of the brain is equal to or greater than a predetermined value. However, instead of the oxygenated hemoglobin concentration in Wernicke's area of the brain, the difference between oxygenated hemoglobin concentration and deoxygenated hemoglobin concentration in Wernicke's area of the brain may be used. In other words, the state determination unit 132 determines that the activity state is the adaptive state if the difference between oxygenated hemoglobin concentration and deoxygenated hemoglobin concentration in Wernicke's area of the brain is equal to or greater than a predetermined value B1, and determines that the activity state is the non-adaptive state if the difference between oxygenated hemoglobin concentration and deoxygenated hemoglobin concentration in Wernicke's area of the brain is less than the predetermined value B1. In this way, when both oxygenated hemoglobin and deoxygenated hemoglobin concentrations are high, auditory stimulation is provided to the user effectively without forcing further supply of oxygenated hemoglobin on the subject by providing auditory stimulation to the subject. As a result, the impact on the subject's health can be reduced. In addition, the difference between oxygenated hemoglobin concentration and deoxygenated hemoglobin concentration can be used as a relative value to allow for individual differences.

Sixth Modification

The memory consolidation determination unit 135 determines whether memories are in the consolidated state or the non-consolidated state based on whether the oxygenated hemoglobin concentration in Wernicke's area of the brain is equal to or greater than, or less than a predetermined value. However, instead of oxygenated hemoglobin concentration in Wernicke's area of the brain, the difference between oxygenated hemoglobin concentration and deoxygenated hemoglobin concentration in Wernicke's area of the brain may be used. In other words, the memory consolidation determination unit 135 may determine that memories are in the consolidated state if the difference between oxygenated hemoglobin concentration and deoxygenated hemoglobin concentration in Wernicke's area of the brain is equal to or greater than a predetermined value B2, and determine that memories are in the non-consolidated state if it is less than the predetermined value B2.

Seventh Modification

The state determination unit 132 determines the activity state in Wernicke's area as a predetermined region of the brain of the subject, in the example described above. However, Broca's area may be added as a predetermined region of the brain. In other words, for example, the state determination unit 132 determines that the activity state is the adaptive state if the oxygenated hemoglobin concentration in both of Wernicke's and Broca's areas of the brain is equal to or greater than a predetermined value (threshold values A3 and C3, respectively), and determines that the activity state is the non-adaptive state if the oxygenated hemoglobin concentration in at least one of Wernicke's and Broca's areas of the brain is less than the threshold values A3 and C3, respectively. In this case, the memory consolidation determination unit 135 determines that memories are in the consolidated state if the oxygenated hemoglobin concentration in both of Wernicke's and Broca's areas of the brain is equal to or greater than a predetermined value (threshold values A4 and C4, respectively), and determines that memories are in the non-consolidated state if the oxygenated hemoglobin concentration in at least one of Wernicke's and Broca's areas of the brain is less than the threshold values A4 and C4, respectively.

Each of the modifications as described above can be combined with other modifications.

A memory consolidation controller, a memory consolidation method, and a non-transitory storage medium can be used for a processing apparatus such as a computer, for example.

The present application enables efficient memory consolidation in a subject.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A memory consolidation controller comprising:
an acquisition unit configured to acquire brain activity information indicating a state of brain activity of a subject;
a determination unit configured to determine a sleep level indicating a depth of sleep of the subject and determine an activity state in a predetermined region of the subject's brain based on the acquired brain activity information; and a reproduction control unit configured to cause a reproduction device to reproduce a content that stimulates an auditory sense of the subject based on a determination result of the determination unit, wherein the reproduction control unit is further configured to cause the reproduction device to reproduce a first content containing a content to be memorized by the subject as the content when the determination unit determines that the sleep level is a first level and the activity state is a predetermined state.

2. The memory consolidation controller according to claim 1, wherein the first level is a level corresponding to REM sleep and the predetermined state is a state in which each of oxygenated hemoglobin concentration in Wernicke's area and that of Broca's area of brain of the subject is equal to or greater than a predetermined value respectively.

3. The memory consolidation controller according to claim 1, wherein the reproduction control unit is further configured to cause the reproduction device to reproduce a second content different from the first content as the content when the determination unit determines that the sleep level is a second level different from the first level.

4. The memory consolidation controller according to claim 3, wherein the second level is a level corresponding to a stage 1 of non-REM sleep or a stage 2 of non-REM sleep.

5. The memory consolidation controller according to claim 1, further comprising:

a memory consolidation determination unit configured to determine whether the content is consolidated as memories, wherein the reproduction control unit is further configured to cause the reproduction device to perform at least one of changing the content reproduced by the reproduction device and changing a reproduction mode of the content in the reproduction device based on a determination result of the memory consolidation determination unit.

6. The memory consolidation controller according to claim 5, wherein the predetermined state is a state in which oxygenated hemoglobin concentration in Wernicke's area of the subject's brain is equal to or greater than a first threshold value.

7. The memory consolidation controller according to claim 5, wherein the memory consolidation determination unit is further configured to determine that the content is consolidated as memories when oxygenated hemoglobin concentration in Wernicke's area of the subject's brain is equal to or greater than a second threshold value.

8. The memory consolidation controller according to claim 5, further comprising a stimulation control unit configured to cause a stimulus application device to apply a stimulus to a sense different from an auditory sense of the subject when the content is reproduced.

9. A memory consolidation method comprising:

acquiring brain activity information indicating a state of brain activity of a subject;

determining a sleep level indicating a depth of sleep of the subject and determining an activity state in a predetermined region of the subject's brain based on the acquired brain activity information; and causing a reproduction device to reproduce content that stimulates an auditory sense of the subject based on a determination result, wherein the causing further comprises causing the reproduction device to reproduce a first content containing a content to be memorized by the subject as the content when determining that the sleep level is a first level and the activity state is a predetermined state.

10. A non-transitory storage medium that stores a memory consolidation program for causing a computer to perform processing comprising:

acquiring brain activity information indicating a state of brain activity of a subject;

determining a sleep level indicating a depth of sleep of the subject and determining an activity state in a predetermined region of the subject's brain based on the acquired brain activity information; and causing a reproduction device to reproduce content that stimulates an auditory sense of the subject based on a determination result, wherein the causing further comprises causing the reproduction device to reproduce a first content containing a content to be memorized by the subject as the content when determining that the sleep level is a first level and the activity state is a predetermined state.

* * * * *